United States Patent [19]

Daugherty et al.

[11] 4,211,983
[45] Jul. 8, 1980

[54] HIGH ENERGY ELECTRON BEAM DRIVEN LASER

[75] Inventors: Jack D. Daugherty, Winchester; Jonah H. Jacob, Cambridge; Joseph A. Mangano, Belmont, all of Mass.

[73] Assignee: Avco Everett Research Laboratory, Inc., Everett, Mass.

[21] Appl. No.: 901,600

[22] Filed: May 1, 1978

[51] Int. Cl.² ............................................. H01S 3/097
[52] U.S. Cl. ......................... 331/94.5 PE; 313/231.4
[58] Field of Search ................... 331/94.5 PE, 94.5 G; 313/231.4, 231.6, 161

[56] References Cited

U.S. PATENT DOCUMENTS

| | | | |
|---|---|---|---|
| 3,702,973 | 11/1972 | Daugherty et al. | 331/94.5 PE |
| 3,963,994 | 6/1976 | Alger et al. | 331/94.5 PE |
| 4,047,125 | 9/1977 | Dreyfus | 331/94.5 PE |

*Primary Examiner*—James W. Davie
*Attorney, Agent, or Firm*—M. E. Frederick

[57] ABSTRACT

Improved electron beam driven gas laser method and apparatus with the achievement of high single pulse energies therefore enabled by establishment of a magnetic field in a direction substantially parallel to the desired direction of electron beam propagation into a gas. The applied magnetic field is made substantially uniform and sized to exceed that of the self induced magnetic field of the current established by the electron beam, alone or in combination with a discharge current (optionally) established in the gas.

17 Claims, 8 Drawing Figures

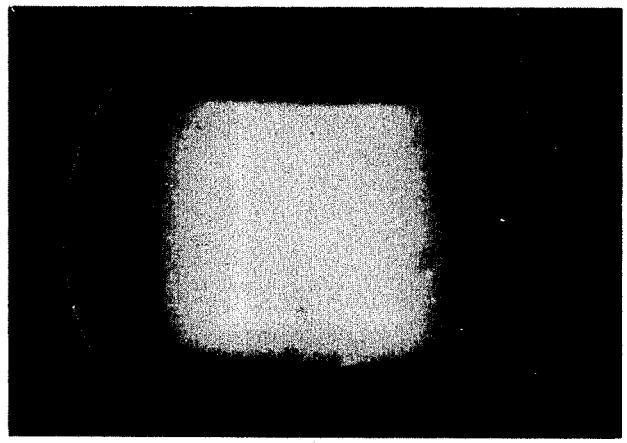
FIG. 4B WITH GUIDE FIELD
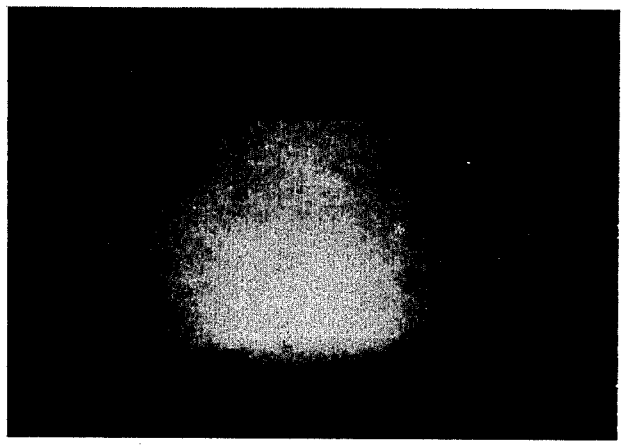
FIG. 4A WITHOUT GUIDE FIELD

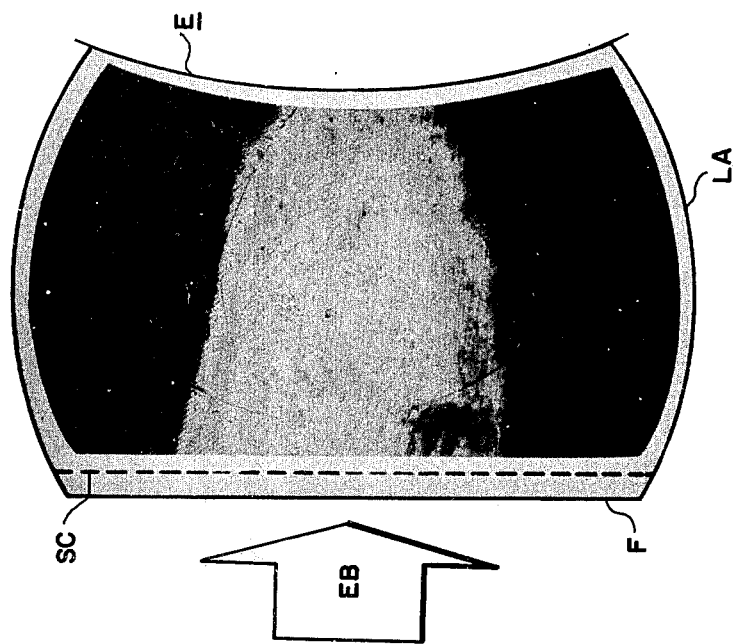
FIG. 5B  WITHOUT GUIDE FIELD
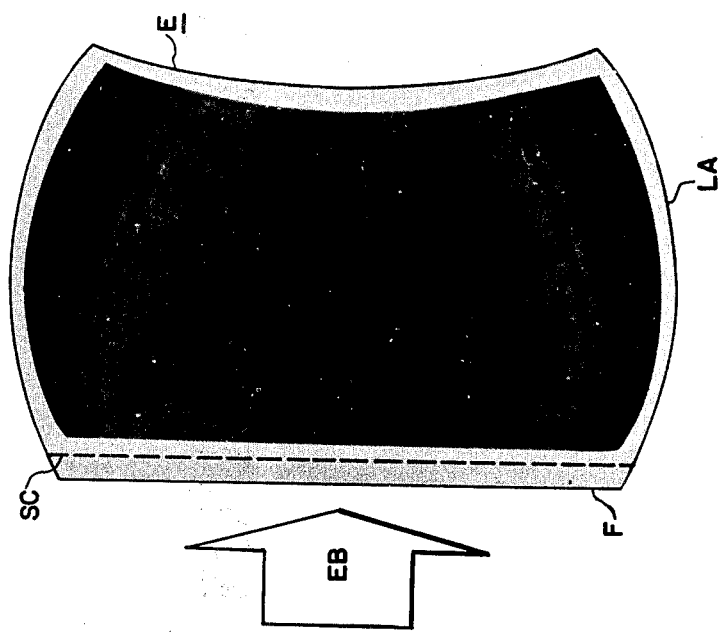
FIG. 5A  WITH GUIDE FIELD

HIGH ENERGY ELECTRON BEAM DRIVEN LASER

BACKGROUND OF THE INVENTION

This application describes an invention made or partially made in the course of work under a U.S. Government contract, viz Defense Advanced Research Projects Agency Contract No. N00014-76-C-1032. A royalty-free, non-exclusive license has been granted to the U.S. Government to utilize the invention for government purposes.

The present invention relates to improvements in apparatus and method of producing a spatially uniform controlled discharge substantially throughout a gaseous working medium, e.g., for a gas laser.

High power laser systems have been under development for over 15 years for potential use in military weapons systems mining, manufacturing and other applications. Advances have been made in this field in the development of gas lasers. In one of several types of such lasers, a gaseous working medium in a walled-in cavity is excited by an externally generated electron beam having a cross sectional area conforming substantially to a cross section of the working region containing the gas and which is introduced into the working region through a wall to produce secondary electrons in the medium in a substantially uniform density throughout the cross section and providing an electric field to accelerate the secondary electrons and increase their temperature to a level sufficient to establish a population inversion of the gaseous medium—lasing action. Exemplary of such art is U.S. Pat. No. 3,702,973 granted Nov. 14, 1972, to Daugherty et al. and which is of common assignment with this application.

Various techniques of electrical pumping can be used to achieve inverted populations in gases among which are (1) electric discharge, (2) pulser sustainer, (3) electron beam sustainer, (4) electron beam (alone), and (5) electron beam initiated discharge. To explain briefly—

(1) Electrical discharges are used to pump nitrogen and helium-neon lasers, for example. In this method of pumping an electric current is passed through the gas which is continuously being ionized, that is, electrons and ions are continuously created in the gas by the electric current. The current does not avalanche or arc because the electrons and ions diffuse to the walls where they are extinguished at a rate which equals the rate at which they are created. Lasers pumped in this way can be pulsed or operated continuously (nitrogen lasers can be operated only in the pulsed mode).

(2) Electron-ion pairs which are created continuously when a current flows through a gas must be extinguished at a rate which equals the rate at which they are created otherwise the current would grow beyond manageable limits or would diminish rapidly to a useless value. The rate at which the electron-ion pairs are extinguished on the walls depends on the rate at which they diffuse through the gas to the walls. This rate sets a practical upper limit on the size and hence output power of any device. To overcome this limit, the pulser-sustainer laser was invented. In this technique, a short high-voltage pulse is impressed on the laser gas to create ions and electrons and then a somewhat lower voltage is impressed on the now ionized gas to drive a current—the sustainer current—through it. It is this current which actually pumps the gas, that is, creates the population inversion. (The initial high voltage pulse may produce some excited atoms or molecules but their number is small compared to those produced by the sustainer current.) The size of the voltage in the second pulse is adjusted so that it does not create more electron ion pairs, that is, the resulting discharge is a non-self sustained discharge.

(3) A natural, although not easy, transition to an electron beam-sustainer technique in which the electrons are provided by an electron beam introduced into the laser gas, was manifested here by another invention. In this technique, a high voltage cathode is used to produce electrons which are shaped into a broad area beam and accelerated. After passing through a thin foil, the purpose of which is to isolate the e-beam gun from the laser gas, the electrons pass into the gas. As in the pulser-sustainer laser, a sustainer voltage is impressed on the gas producing a sustainer current thereby pumping the gas and producing an inverted population. The sustainer voltage is adjusted so that, as in the pulser-sustainer technique, the resulting discharge is a non-self sustaining discharge. The e-beam does excite some of the molecules in gas, but again, this excitation is minor compared to that produced by the sustainer current. This electron beam/sustainer technique typically is used to pump $CO_2$ lasers. See e.g., the Daugherty patent cited above.

(4) An electron beam alone may be used to pump a laser. The current pulse used in the electron beam is somewhat greater than that used in the electron beam sustainer technique, of the order of tens or hundreds of amps/$cm^2$ rather than tens of milliamps. Usually the electrons forming the beam come from a cold cathode—some sort of knife edge or razor edge structure. The necessary voltage may be generated in a Marx generator in which the high voltages are obtained by charging up capacitors in parallel and discharging them in series to form a short pulse. An alternative way is to charge up a cable and discharge it so as to form the pulse.

(5) A combination of an electron beam and a self ionizing discharge may also be used to pump a laser. The electron beam may be produced from a knife-edge cold cathode and accelerated by a voltage generated in a Marx generator or a charged cable. The discharge pulse is commonly obtained by charging a capacitor and connecting it momentarily across the electrodes in the laser cavity. In this mode, the discharge current produces more electron-ion pairs than are extinguished on the walls. It may be stabilized by adding a gas such as fluorine which attach electrons strongly.

Despite inherent scalability in principle of the three categories of device mentioned above, substantial practical difficulties associated with "pinch effect" have been encountered and unresolved for many years by those skilled in the art.

There is always a magnetic field associated with an electric current. This self field encloses the current and tends to force the current into itself. This is known as the pinch effect. In a high power electrically pumped gas laser in which the currents are large and the high energy or beam electrons are free to move, the effect can be significant because it limits the aperture (practical envelope) of the laser.

For any given laser gas, there is an optimum voltage (or operating point) which can be applied to a gas and therefore the energy that can be introduced into it. This establishes the laser output power. To compensate for this, the volume of the laser may be increased. However, the pinch effect tends to reduce the effect of increasing the volume by forcing the currents to flow through only the center portion thereby "starving" other regions. This places a restriction on the size of the laser cavity and hence the output energy and power.

The prior art approach to overcoming this limit on the output power of lasers have been to build a laser with many apertures, in essence, to build many lasers to do this job of one. See for example "Electron Beam Ionized Lasers" by J. Daugherty, Chapter (9) in "Principles of Laser Plasmas: (Ed. George Bekefi, John Wiley and Sons, New York, 1976) and see also FIG. 14 of Los Alamos Scientific Laboratory report LA-6834-PR, Laser Fusion Program, Oct. 1–Dec. 31, 1976, Issued Oct. 1977, which is a transverse section of a laser which will be built with twelve (12) apertures. A second approach is to increase electron beam energy. The first solution increases the weight, size, in some cases the complexity, and the cost of the laser. The second involves generating and handling high voltages which also adds complexity, size, weight and cost.

There has been substantial effort in the art to scale such electron beam ionized lasers to large single pulse energies. Increasing efficiencies of such lasers is a related goal.

It is an important object of the present invention to increase the efficiency and scalability of electron beam ionized lasers and the like.

It is a further object of the invention to increase the predictability and reliability of apparatus and method for electron beam ionized discharges or lasers and the like, consistent with the preceding object.

It is a further object of the invention to eliminate self-pinching of the ionizing electron beam and/or to limit scattering of electron beam by the entrance wall (usually a foil) and the high pressure gas of a working region, consistent with one or more of the preceding objects.

It is a further object of the invention to stabilize and make uniform the discharge current density (the discharge current which sometimes flows counter to the electron beam), consistent with one or more of the preceding objects.

SUMMARY OF THE INVENTION

The foregoing objects are achieved with respect to the devices of classes (3), (4), (5), above, by providing a magnetic field substantially aligned with the known pumping electron beam which is provided to the working region of a high power gas laser or the like. The magnetic field is sized to provide a level exceeding that of the self-generated magnetic field of the electron beam for an electron beam pump or device or the electron beam and discharge current for an electron beam sustainer device or the like. Apparatus for implementing such improvement can comprise one or a pair of spaced electromagnetic coils outside the laser cavity surrounding the anode and cathode of the discharge working region. Permanent magnets or magnetic elements can also be utilized in lieu of or complementarily with electromagnets.

In the past, cold cathode and hot cathode discharge devices such as vacuum ionization gauges, electric vacuum pumps and magnetrons for radio and communication devices and cyclotrons and linear eaccelerators have utilized external magnetic fields in conjunction with electric discharges or electron beams. But such external magnetic fields have not been used in electron beam ionized lasers and instead costly and difficult expedients have been used, as described above, while seeking improvements in efficiency and scalability now made possible through the combination of the externally applied magnetic guide field with the externally generated electron beam, appropriate aligned therewith and sized in relation thereto as described above.

As an example of efficiency and scalability allowed through the present invention, a 300,000 electron volt, 10 ampere/cm$^2$ electron beam can be generated over a maximum height of 20 cm. before pinching effects under the influence of the electron beam generated magnetic field provide a limit against further scalability. But larger current density times height product (figure of merit) are required in electron beam pumped lasers to reach large single pulse energies. Such products are achievable in accordance with the present invention in a practical way by using a guide magnetic field. For example, a one kilogauss magnetic field can easily guide such an electron beam having a current of 10 amperes per square centimeter and a height of 50 cm. against the effect of self-pinching.

The magnetic guide field also counteracts scattering of electron beams by the foil wall of the laser cavity and also limits scattering by the gas within the cavity. Typically, a magnetic guide field adequate to sufficiently counteract pinching is also adequate to sufficiently counteract scattering. Where a discharge is generated within the cavity (not all electron beam assisted laser devices have such a discharge) the discharge current is similarly stabilized against pinch effects by the magnetic field of discharge current which can pinch or diverge the electron beam depending on whether the discharge current is directed parallel or anti-parallel to the electron beam current. This makes the ionization characteristics of the discharge more uniform throughout the cross section thereof and this in turn enables closer optimization of laser operating conditions.

Other objects, features and advantages of the invention will be apparent from the following detailed description thereof, taken in connection with the accompanying drawing, in which,

BRIEF DESCRIPTION OF THE DRAWING

FIGS. 3A and 3B are calculated contours of constant e-beam energy deposition within the laser cavity of the device shown in FIG. 1 without and with guide field magnetic elements of the FIG. 1 apparatus.

FIGS. 4A and 4B are open shutter photographs of visible fluorescence emitted from an electron beam excited krypton fluoride laser gas mixture without and with a magnetic guide field, respectively, and showing the effect of the guide field on electron beam control.

FIGS. 5A and 5B are photographs of laser burn profile superimposed on a schematic outline of the cross section of the laser cavity with and without a magnetic guide field, respectively, and showing the effect of the guide field on discharge current related phenomena.

DETAILED DESCRIPTION OF PREFERRED EMBODIMENTS

Figure 1:
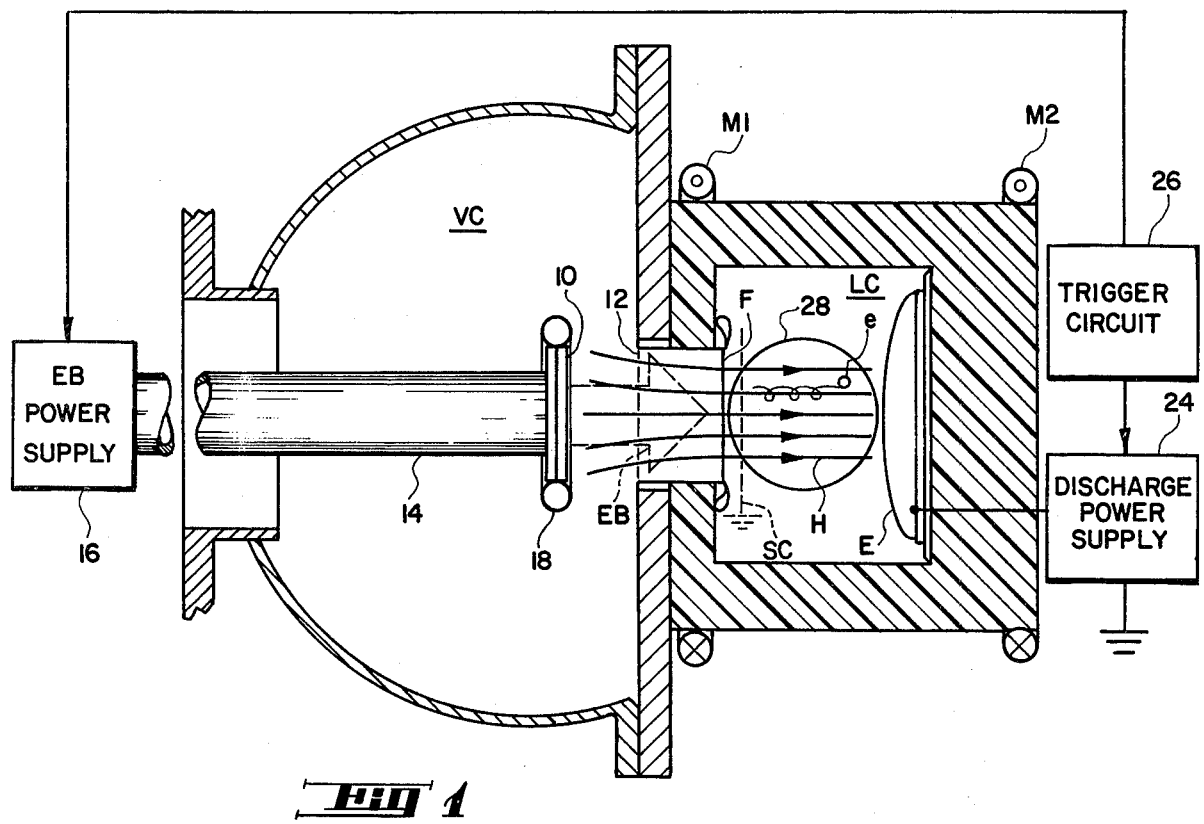
FIG. 1 is a cross section-semi-schematic view of an electron beam sustained gas laser apparatus utilizing the improvement of the invention.

Referring now to FIG. 1, there is shown an electron beam generator comprising a vacuum chamber VC and a laser cavity LC. The vacuum chamber VC is evacuated by a conventional pumping system (not shown) and the laser cavity LC is maintained at a desirable pressure of working gas (typically 0.5–5 atmospheres) by a conventional gas handling system (not shown). The two chambers are separated by a thin gas-tight electron transparent foil F. Within the vacuum chamber is a conventional cold cathode system 10 and an accelerating screen or grid form anode 12, cathode lead structure 14 and electron beam generation power supply 16 comprising a Marx capacitive generator or cable type generator of pulsating high voltages to cause emission of an electron beam EB. An electrostatic shield electrode at cathode potential is provided at 18. The electron beam as introduced into the cavity has a broad cross section area, corresponding to a broad longitudinal section area of laser cavity LC sufficient in relation to pressure of the working medium therein, overall volume thereof and applied voltages and heavy current to establish a discharge in the cavity which is not wall dominated (i.e., wherein discharge stabilization by electric ion pair diffusion to confining walls is negligible in relation to other concurrent modes of discharge stabilization). A related criterion is that such an area is greater than the square of length of the cavity LC (i.e., path traveled by beam EB from foil F to electrode E). For purposes of high power gas lasers, and equivalent discharges for other uses, these criteria will usually involve a height of 10 cm. or more and electron beam width (corresponding to effective cavity length) of 100 cm. or more.

Magnetic field coils M1 and M2 are provided around the laser cavity LC and arranged to provide a magnetic guide field therein as schematically indicated at H. The polarity of the guide field is not critical. At least a component vector of the magnetic guide field is parellel to the electron beam current and coincident therewith. The effect thereof on an electron is indicated at "e" a representation of an electron following a tight spiral path under the influence of the field. An electrode E (cathode or anode) opposes a screen electrode SC. A discharge circuit power supply 24, coordinated in operation with the electron beam by a trigger circuit 26, establishes electrode E positive or negative relative to grounded screen SC to produce discharge current pulses in cavity LC. The discharge current is within the magnetic guide field and preferably substantially parallel with it. The discharge current is also parallel or anti-parallel (i.e., parallel, but opposite sense of movement) to the electron beam current introduced into the cavity through foil F. The magnetic guide field may be constant or pulsating, singly poled or of changing polarity.

The lasing action within cavity LC when a gas therein is pumped by the electron beam (or a discharge created therefrom) creates an optical beam which travels back and forth between two reflectors; one of which is shown at 28, in a direction perpendicular to the cross section of FIG. 1. The electron beam current and discharge current, if any, are established in a direction transverse to the direction of optical beam movement in cavity LC. The gas or other working medium in the laser cavity is lasable and the electron beam is sufficient alone or in combination with a discharge established by electrodes in cavity LC, to provide a population inversion sufficient to support stimulated emission of radiation in the medium.

Figure 2:
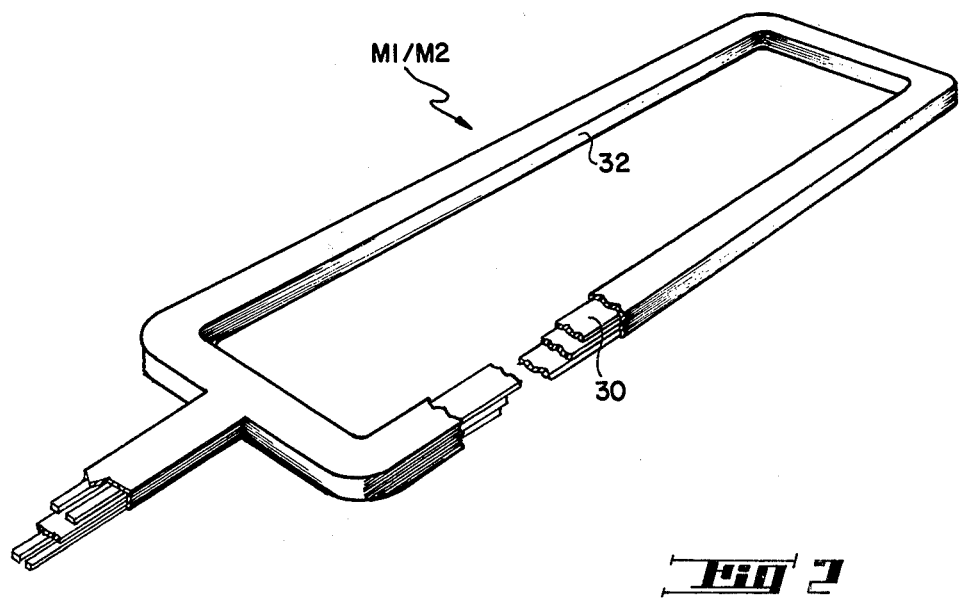
FIG. 2 is an isometric view of a magnetic coil component of the FIG. 1 apparatus.
Figure 7A:
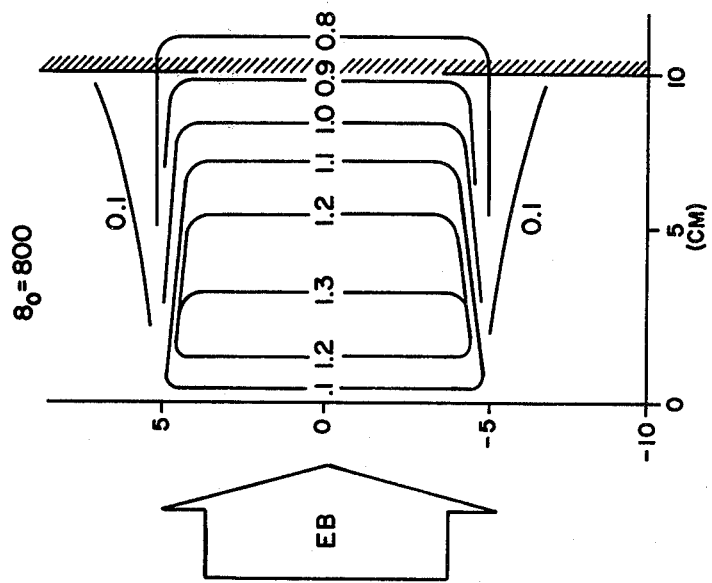
Figure 7B:
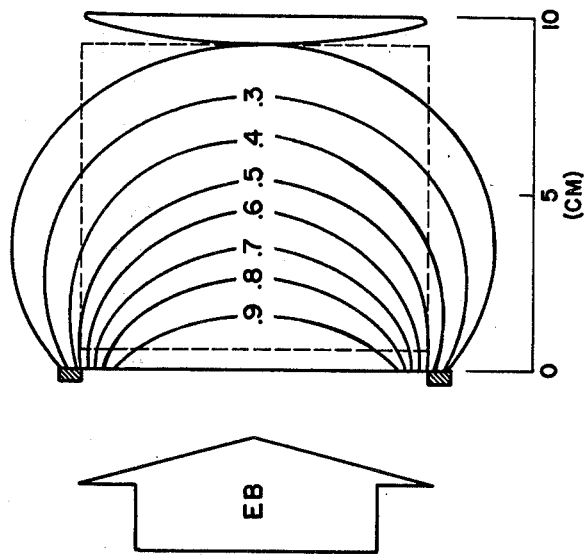

The coils M1 and M2 can be made of copper strip conductors (30, FIG. 2), which are covered with insulation 32 and shaped to provide the necessary magnetic field. The coils are typically designed to generate a guide field H of several hundred to several thousand gauss in the cavity LC (FIG. 1), at least roughly aligned with the beam EB. Such field may diverge at the cathode 10 and just exterior of the cavity to about $\frac{2}{3}$ of its peak value. These relative field strengths establish a form of guide field which slightly compresses the electron beam EB as it propagates from the gun vacuum chamber VC to enter the laser cavity LC. The magnetic coils may be uncooled or cooled by liquid or gas coolants. In some instances, it will be desirable to cool to near absolute zero (e.g., 4.2° K., helium boiling temperature) to operate the conductors of coils M1 and M2 superconductively (the conductors being selected as appropriate metals for that purpose—e.g., Nb, $Nb_3Sn$, $V_3Ga$, Nb-Ti alloys or combinations thereof). The guide field strength, direction and arrangement are, in any event, controlled to counteract the electron beam and discharge current pinching effect(s) and electron beam nonuniformities and foil scattering of the beam that would otherwise occur. A guide field which accomplishes all these purposes is one which, within laser cavity LC and within the electron beam current and discharge current therein, has an intensity greater than the self-induced magnetic field of the electron beam current (which could cause pinching of the beam in the absence of such guide field) and preferably which is at least twice the intensity of said self-induced field.

Electron beam generator cold cathode type sources preferably comprises an array of knife edge cathodes and its power supply is on the order of several hundred kilovolts for high power laser purposes. In work described in the following Examples, a source was used which produced an electron beam of 300 kilo-electron volts having a 1–20 amp/$cm^2$ beam current density. The electrons were emitted during pulsing excitation periods of 200 nanoseconds to 1 microsecond. The cross section dimensions of the electron beams were 10 cm $\times$ 100 cm. Most of the energy released from the power supply, where it is stored in a delay line type cable or capacitive Marx bank or the like, was converted into beam energy. Beam electrons were accelerated through full anode to cathode potential so that beam energy losses in foil F were minimized.

The foil F may comprise a high temperature plastic (e.g., KAPTON brand or other polyimide) or metal (e.g., aluminum or titanium) of 1–2 mil thickness, backed by an 80% open plate or plate like support structure (not shown).

The discharge circuit 24 and trigger circuit 26 were arranged to provide a 1–100 kilovolt pulse of about 250 nanoseconds duration beginning about 40 nanoseconds after beginning of each electron beam pulse.

The lasing medium used in the following Examples, in an apparatus as described above in connection with FIGS. 1–2, was an approximately 4% krypton/0.2% fluorine/95.8% argon mixture of 1.5 atmospheres pressure.

EXAMPLE 1

Under the conditions described above and using a 2 mil polyimide foil, contours of relative electron beam energy deposition were calculated and plotted in and around the laser cavity LC of FIG. 1 without and with a magnetic guide field B (of 800 gauss established by coils M1 and M2). These contours are shown in FIGS. 3A and 3B respectively. The x and y axes are transverse and longitudinal distances, respectively (both in cm).

EXAMPLE 2

Open shutter photographs of FIGS. 4A and 4B were taken of the visible fluorescence of the lasing medium excited by the pulsed electron beam without a magnetic guide field (FIG. 4A) and with a magnetic guide field of 800 gauss (FIG. 4B). Without a guide field scattering by the foil causes the beam to spread and nonuniformly fill the laser cavity with the beam (FIG. 4A). However, as shown in FIG. 4B, the scattering effects are counteracted and the beam is confined, has negligible spreading and is substantially uniform.

EXAMPLE 3

Lasing experiments were tried without and with the above guide field with the following results:

|  | Without | With |
|---|---|---|
| Laser Energy/Energy Deposited (%) | 3 | 9 |
| Energy Extraction (Joules/liter) | 2.5 | 12 |

EXAMPLE 4

The effect of the guide field on pinching by discharge current magnetic field (as opposed to electron beam current magnetic field evaluated in Example 2 above) was established with the results shown in the laser burn patterns of FIGS. 5A and 5B. The effect of operating without a magnetic guide field is shown in FIG. 5B. The electron beam was 10 cm. high as it entered the cavity through foil F and was pinched by the discharge current magnetic field with the result of producing more ionization at beam center than above or below within the laser aperture. When a magnetic guide field was applied (800 gauss) the burn pattern filled the laser aperture with substantially uniform ionization.

It will be appreciated that instead of two spaced electromagnetic coils, as shown above, a single coil can be used albeit less effectively. Magnetic structure can be emplaced inside the structures VC and/or LC.

Multiple electron beam generators can be provided on opposed sides of the lasing cavity LC to produce more complete and uniform stimulated emission of radiation when operating the laser in any of the modes (3), (4), (5) indicated above.

The principles of the present invention can be applied to discharge or electron beam activated devices other than gas lasers, e.g., for electron beam photochemical processes, for electrostatic precipitators and for switches.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and the spirit of the appended claims.

What is claimed is:

1. In the method of producing stimulated emission of radiation from a lasable gas disposed in a working region in a cavity having an optical axis and imperforate walls for confining said gas and comprising part of a gas laser, the steps comprising:
   (a) providing a gaseous lasable medium in said cavity;
   (b) generating exterior of said cavity a broad area electron beam having a current density sufficient to generate a self-induced magnetic field effective to cause pinching of said electron beam, said electron beam being at least in part effective to provide a population inversion sufficient to support said stimulated emission of radiation;
   (c) introducing said broad area electron beam into said cavity through a wall thereof transverse to said optical axis; and
   (d) establishing a guiding magnetic field having disposed substantially within it said broad area electron beam, said guiding magnetic field further having a vector substantially parallel to and coincident with the direction of said electron beam and an intensity greater than that of said self-induced magnetic field.

2. The method as defined in claim 1 wherein
   (a) said gas is provided in said cavity at a pressure sufficient to cause substantial scattering of the electrons of said electron beam as it passes through said gas; and
   (b) establishing said guiding magnetic field with an intensity to at least substantially prevent transport of electrons of said electron beam out of said working region.

3. In the method of producing stimulated emission of radiation from a lasable gas disposed in a working region in a cavity having an optical axis and imperforate walls for confining said gas and comprising part of a gas laser, the steps comprising:
   (a) generating exterior of said cavity a broad area electron beam having a current density sufficient to generate a self-induced magnetic field effective to cause pinching of said electron beam, said electron beam being at least in part effective to provide a population inversion sufficient to support said stimulated emission of radiation;
   (b) providing a gaseous lasable medium in said cavity at a pressure sufficient to cause a substantial scattering of the electrons of said electron beam as it passes through said gas;
   (c) introducing said broad area electron beam into said cavity through a wall thereof transverse to said optical axis; and
   (d) establishing a guiding magnetic field having disposed substantially within it said broad area electron beam, said guiding magnetic field further having a vector substantially parallel to and coincident with the direction of said electron beam and an intensity sufficient to substantially prevent transport of electrons of said electron beam out of said working region.

4. The method as defined in claims 1 or 3 wherein said guiding field is sufficient to at least in part counteract said pinching effect along substantially the length of said electron beam as it progresses toward and through said cavity and scattering of said electron beam within said cavity.

5. In the method of producing a controlled discharge in a working region in a cavity having imperforate walls for confining a gaseous medium, the steps comprising:
   (a) providing a gaseous working medium in said cavity;
   (b) generating exterior of said cavity an electron beam;
   (c) introducing said electron beam into said cavity through a wall thereof;
   (d) applying an electric field across said cavity to produce an electrical discharge therein; and
   (e) establishing a guiding magnetic field having disposed substantially within it said electron beam, said guiding magnetic field further having a vector substantially parallel to and coincident with the direction of said electron beam and an intensity sufficient to at least in part counteract self-induced magnetic fields resulting from said discharge.

6. The method as defined in claim 5 wherein:
   (a) said electron beam has a self-induced magnetic field effective to cause pinching of said electron beam; and
   (b) said guiding magnetic field has an intensity sufficient to at least in part counteract said pinching effect along substantially the length of said electron beam.

7. The method as defined in claim 6 wherein:
   (a) said gaseous working medium is provided in said cavity at a pressure sufficient to cause substantial scattering of the electron beam as it passes through said medium; and
   (b) said guiding magnetic field has an intensity sufficient to at least in part prevent transport of electrons of said electron beam out of said working region.

8. The method as defined in claim 5 wherein an electric discharge is formed within said cavity in a direction substantially parallel to and within said guiding field.

9. The method as defined in claim 5 wherein said electron beam is a broad area electron beam.

10. Gas laser apparatus for producing stimulated emission of radiation from a lasable gaseous working medium, said apparatus comprising:
    (a) means defining a cavity having a working region, an optical axis and imperforate walls for confining a gas;
    (b) means for introducing said lasable gaseous working medium into said cavity;
    (c) means for introducing into said cavity, through a wall thereof and transverse to said optical axis, a broad area electron beam, said electron beam being at least in part effective to provide a population inversion in said lasable gaseous working medium sufficient to support said stimulated emission of radiation; and
    (d) magnetic field forming means for establishing a guiding magnetic field having disposed substantially within it said broad area electron beam, said guiding magnetic field further having a vector substantially parallel to and coincident with the direction of said electron beam.

11. Gas discharge apparatus for producing a controlled discharge in a gaseous working medium, said apparatus comprising:
    (a) means defining a cavity having a working region and imperforate walls for confining a gas;
    (b) means for introducing said gaseous working medium into said cavity;
    (c) means for introducing into said cavity through a wall thereof an electron beam;
    (d) means for applying an electric field across said cavity to produce therein an electrical discharge resulting in a self-induced magnetic field; and
    (e) magnetic field forming means for establishing a guiding magnetic field having disposed substantially within it said electron beam, said guiding magnetic field further having a vector substantially parallel to and coincident with the direction of said electron beam and an intensity sufficient to at least in part counteract the self-induced magnetic field resulting from said discharge.

12. Apparatus as defined in claim 11 wherein said magnetic field forming means is capable of establishing said guiding field to at least in part counteract pinching of said electron beam along substantially the length of said electron beam as it progresses toward and through said cavity and scattering of said electron beam within said cavity.

13. Apparatus as defined in claim 12 wherein:
    (a) said working medium is a lasable gaseous mixture; and
    (b) said electron beam is at least in part effective in providing a population inversion sufficient to support stimulated emission of radiation in said lasable gaseous mixture.

14. Gas laser apparatus as defined in claim 10 wherein:
    (a) said broad area electron beam has a current density sufficient to generate a self-induced magnetic field effective to cause pinching of said electron beam; and
    (b) said guiding magnetic field has an intensity greater than said self-induced magnetic field.

15. Apparatus as defined in claim 10 wherein:
    (a) said gaseous working medium is provided in said cavity at a pressure sufficient to cause substantial scattering of the electrons of said electron beam as it passes through said gas; and
    (b) said guiding magnetic field is established with an intensity sufficient to at least substantially prevent transport of electrons of said electron beam out of said working region.

16. Gas laser apparatus for producing stimulated emission of radiation from a lasable gaseous working medium, said apparatus comprising:
    (a) means defining a cavity having a working region, an optical axis and imperforate walls for confining a gas;
    (b) means for introducing into said cavity, through a wall thereof and transverse to said optical axis, a broad area electron beam having a current density sufficient to generate a self-induced magnetic field effective to cause pinching of said electron beam, said electron beam further being at least in part effective to provide a population inversion in said lasable gaseous working medium sufficient to support said stimulated emission of radiation;
    (c) means for introducing a lasable gaseous working medium into said cavity at a pressure sufficient to cause substantial scattering of the electrons of said electron beam as it passes through said gaseous working medium; and
    (d) magnetic field forming means for establishing a guiding magnetic field having disposed substantially within it said broad area electron beam, said guiding magnetic field further having a vector substantially parallel to and coincident with the direction of said electron beam and an intensity sufficient to substantially prevent transport of electrons of said electron beam out of said working region.

17. Apparatus as defined in claim 16 wherein said guiding magnetic field has an intensity sufficient to at least in part counteract said pinching of said electron beam.

* * * * *